United States Patent [19]

Kragness

[11] 3,796,328

[45] Mar. 12, 1974

[54] DOLLY FOR THE REAR WHEELS OF A TRUCK BEING LOADED

[76] Inventor: Rodney B. Kragness, Rt. 2, Box 438, Eugene, Oreg. 97401

[22] Filed: July 10, 1972

[21] Appl. No.: 270,190

[52] U.S. Cl............. 214/42 R, 214/86 A, 214/506, 280/400, 280/402
[51] Int. Cl............................................. B65g 67/22
[58] Field of Search ............ 214/42, 43, 86 A, 505, 214/506; 280/400, 402, 503

[56] References Cited
UNITED STATES PATENTS
2,628,733   2/1953   Hale.................................. 214/506
3,693,818   9/1972   Teagarden......................... 214/506
2,786,590   3/1957   Edwards et al..................... 214/506

Primary Examiner—Robert G. Sheridan
Attorney, Agent, or Firm—James D. Givnan, Jr.

[57] ABSTRACT

A dolly enabling the rearward towing of a truck while the driver is stationed on the truck bed to load same. A dolly tongue is jointed permitting remote positioning of the dolly platform into a tilted, truck on loading (off loading) position. Truck mounting means on the dolly platform cooperates with a truck carried harness for automatic locking of the truck on the dolly while permitting relative swinging movement therebetween. An elevator on the dolly tongue directs hay bales over stakes on the truck bed in a modified form of the invention.

11 Claims, 9 Drawing Figures

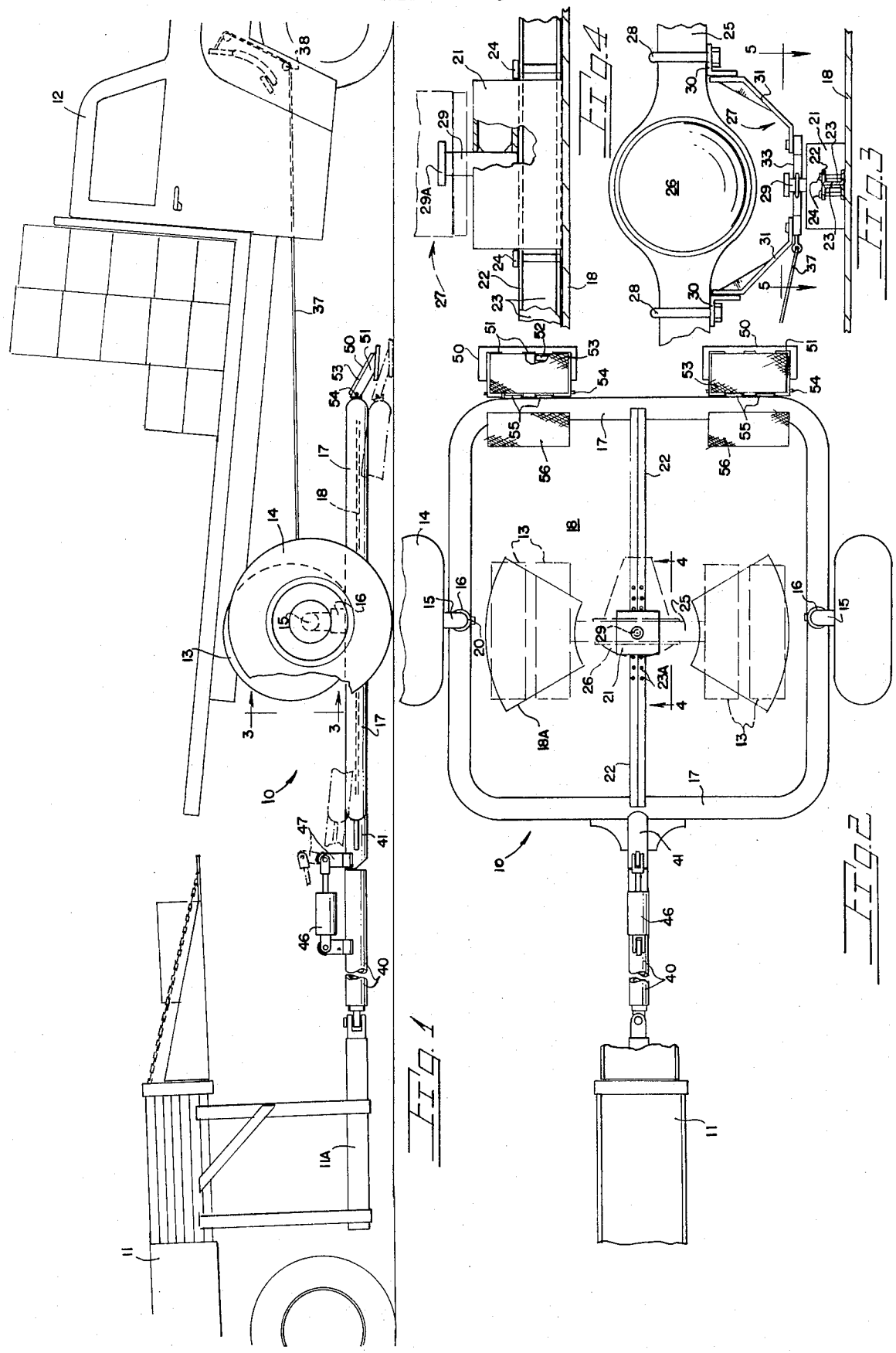

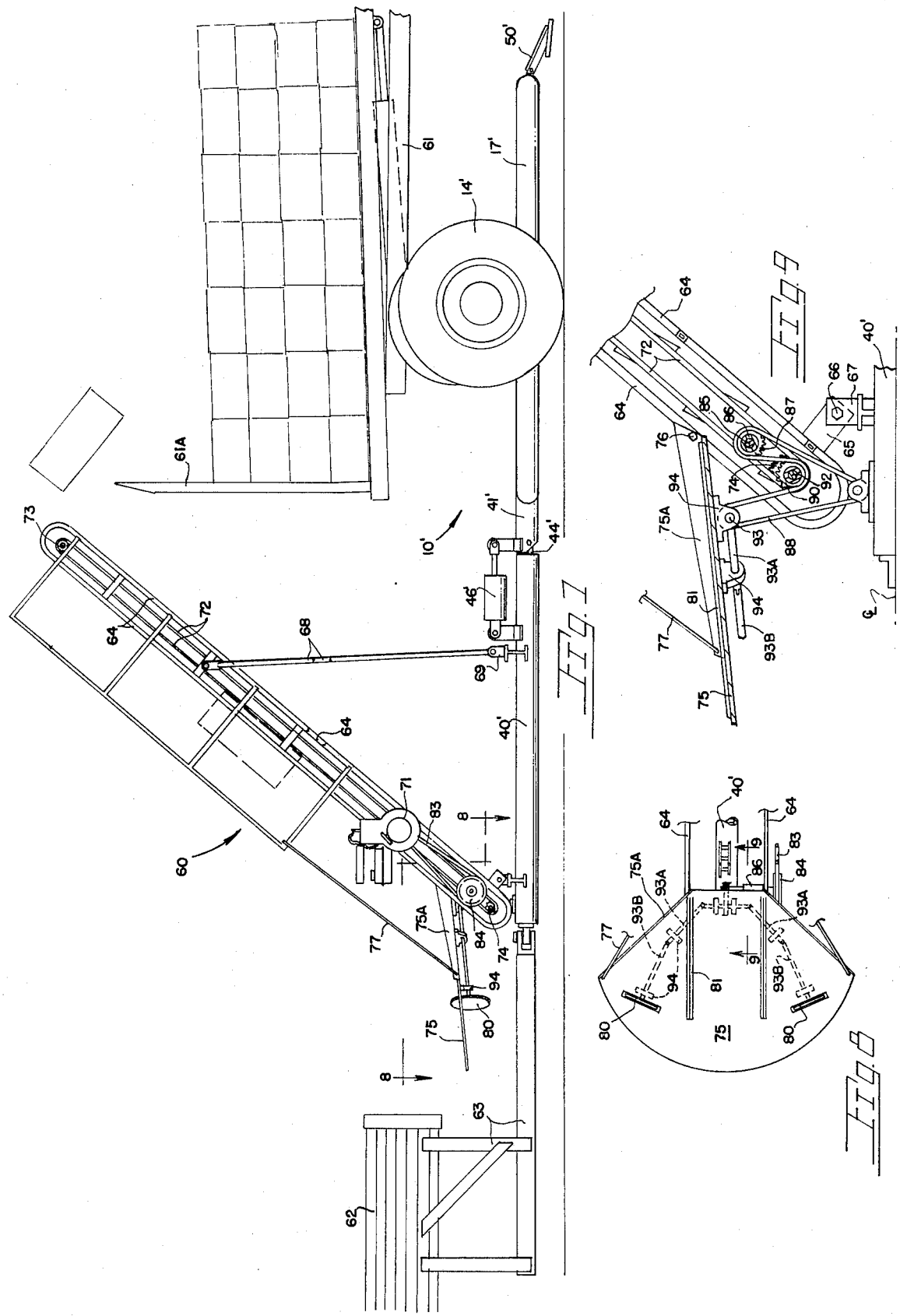

DOLLY FOR THE REAR WHEELS OF A TRUCK BEING LOADED

BACKGROUND OF THE INVENTION

The present invention relates generally to a dolly for supporting the rear wheels of a truck as it is towed through a field during a truck loading operation.

In a typical haying operation, the mown hay is windrowed for processing by a baler with the resulting hay bales being picked up by an elevator mechanism for deposit on a truck bed. Such an operation usually entails a tractor driver for the baler, an elevator operator, a truck driver and a loader for stacking of the bales on the flatbed truck. As hourly wages constitute a significant part of the cost of such a field operation, any reduction in man hour effort will result in lower operating costs to the farmer. This is particularly so with reference to sizable farming operations where substantial labor costs are incurred each harvesting season.

Further, a problem arises in the locating and hiring of part-time, skilled workers for relatively short harvesting periods. Additionally, every worker hired by the farm owner means added administrative, non-productive work on the farm owners part in the preparation of the numerous state and federal reports required by law.

SUMMARY OF THE PRESENT INVENTION

The instant invention is directed toward providing a truck dolly on which the rear wheels of a truck being loaded are supported permitting the truck to be driverless with the driver being utilized to stack bales on the truck bed. Remotely actuated means permit the truck to be positioned in place on the dolly and, after completion of loading, released from the dolly all in a rapid manner with no manual disengagement effort being required.

A dolly platform is supported on large, flotation type wheels for non-damaging travel over fields. The platform is tiltable by means of a jointed, two-piece tongue structure positioned by a hydraulic cylinder controlled by the tractor operator. Pivot means located on said platform cooperates with a harness carried by the truck to couple the truck to the dolly while permitting articulated turning movement between the two. Disengagement of a loaded truck from the dolly is achieved remotely from the truck cab whereupon the truck may be driven off the inclined dolly platform. Ramps are swingably carried by the dolly to provide a smooth transition of the loaded truck from the dolly to the ground.

Carried by the dolly tongue, in one form of the present dolly, is an elevator for transfer of the bale from a baling machine upwardly over the truck bed stakes for deposit on the truck bed. The combination of the bale elevator mechanism with the present dolly enables the use of a truck with fixed stakes such as are used on trucks having dump or tiltable beds. The use of the latter with the present dolly greatly expedites a haying operation.

An important object of the present invention is to provide a dolly for the rearward towing of a driverless truck through a field being harvested. The truck operator is accordingly free to work as a loader to replace the full time individual whose normal duty entailed only stacking of bales on the truck bed. A further feature of delivering bales to truck bed height by means of an elevator on the dolly permits the conducting of a hay loading operation minus a second equipment operator normally operating a separate elevator-type piece of equipment.

A further object of the invention is to provide a dolly and a cooperating truck mounted harness which enable both on loading and off loading of the truck to be accomplished without any risk incurring manual effort in the proximity of the dolly. The truck driver and the tractor operator are provided with controls at their respective work stations to enable both loading and unloading operations to be accomplished without leaving said work stations.

A still further object is to provide a tiltable dolly to facilitate both loading and unloading of the truck. Towards this end, automatically positioning ramps are provided to avoid jarring impacts on the loaded truck as it is driven off the dolly.

A further object resides in the provision of an elevator supported by the dolly and receiving bales for subsequent deposit on the truck bed. In some instances where the baler equipment is capable of discharging bales at truck bed height the elevator may be dispensed with. In instances where bales are to be elevated over truck bed stakes, the elevator is particularly useful and enables use of a dump bed style hay truck, the latter facilitating rapid off loading of the stacked bales.

BRIEF DESCRIPTION OF THE DRAWING

In the accompanying drawing:

FIG. 1 is a side elevational view of the truck dolly embodying the present invention, FIG. 2 is a plan view of the truck dolly with associated parts of the truck being shown in outline form, FIG. 3 is an elevational view taken along 3—3 of FIG. 1 showing an axle mounted harness and cooperating dolly pivot means, FIG. 4 is an elevational view taken along 4—4 of FIG. 2 disclosing details of the dolly mounted pivot means.

FIG. 7 is a side elevational view of a dolly embodying the present invention in combination with a bale elevator structure in place on the dolly tongue, FIG. 8 is a sectional plan view taken along irregular line 8—8 of FIG. 7 showing a bale receiving tray, and FIG. 9 is a vertical sectional view taken along line 9—9 of FIG. 8 showing a drive for bale centering means combined with an elevator conveyor chain drive.

DETAILED DESCRIPTION OF PREFERRED EMBODIMENTS

Figure 5:
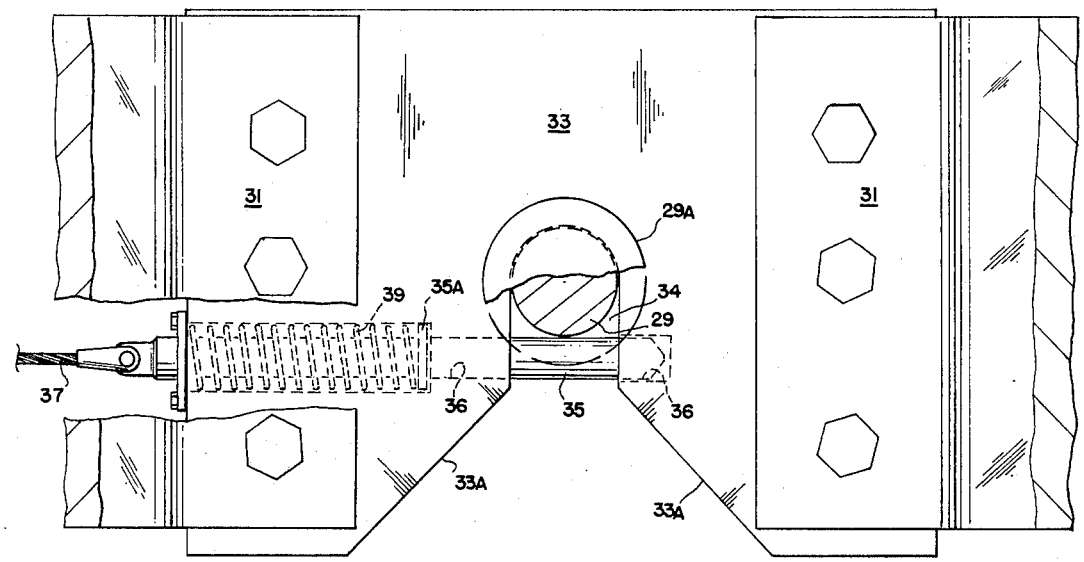
FIG. 5 is a horizontal sectional view taken downwardly along line 5—5 of FIG. 3 showing details of a harness plate carried by the truck.

With continuing reference to the accompanying drawings herein applied reference numerals indicate parts similarly identified in the following specification, the reference numeral 10 indicates generally the truck dolly operationally disposed in towed attachment with farm equipment shown as a baler 11 which itself may be towed or of the self-propelling type. A truck of the flatbed type is indicated at 12 having its dual rear wheels 13 elevated in place on the dolly permitting rearward towing of the driverless truck.

Dolly 10 is wheel supported by means of a wide, flotation-type wheels 14 permitting travel over terrain without damaging same. Axles at 15 in FIG. 2 are of right angular configuration terminating downwardly in adjustable, bolted securement within sockets 16, the latter secured by an annular weld to a dolly perimeter frame member 17. Frame 17 is comprised of welded straight and curved, double strength construction pipe segments constituting a tubular frame for a platform 18 welded medially therewithin.

As best viewed in FIG. 1, the dolly is underslung to provide a low center of gravity for a truck supported thereon. The distance of platform 18 above the ground surface is adjustable by reason of bolt members 20, located within the sockets 16, being positionable within selected pairs of aligned openings formed along the socket engaging, vertical segment of axles 15. Desirably the platform 18 is adjusted to the lowest possible height with primary consideration being given to the type of terrain over which the dolly is to be towed.

Disposed along the center line of the dolly are truck mounting means 21 including a lengthwise orientated support structure 22. Said structure comprises juxtaposed channel members 23 secured to one another by a common weld and to platform 18 and opposed frame segments 17. The truck mounting means 21 includes a box-like structure having an open area formed in two opposing sidewalls for sliding engagement with support structure 22. The box-like structure is retained against vertical movement by horizontally directed flanges of the channel members 23 while inserts at 24 on opposite sides of said structure prevent fore and aft displacement. Openings 23a along the channels for the inserts 24 permit adjustable attachment of the box-like member 21 to support structure 22.

An upright pivot pin at 29 projects from structure 21, said pin having a head at 29a upwardly spaced from the top surface of the box-like member and enabling pivoted engagement with a truck mounted harness plate later described. Pin 29 is secure in structure 21 by a pair of annular welds.

Secured to the truck axle housing 25, oppositely of a differential housing 26, is a harness assembly generally at 27 for engagement with truck mounting means 21. The harness permits remote coupling of the truck to the dolly while not unduly hindering ground clearance of the truck. A pair of U bolt assemblies 28 serve to retain mounting brackets 30 in engagement with the underside of the axle housing. The brackets 30, in turn, carry downwardly and inwardly extending plates 31 jointly supporting pin engaging means 33 in the form of a recessed plate as best seen in FIG. 5. Said plate has beveled walls 33a terminating in a pivot pin receiving opening 34 corresponding in radius to the radius of pivot pin 24. During backing of the unloaded truck into place on the dolly, the walls 33a serve to center the truck permitting seating of pin 29 within the semicircular recess 34 of plate 30. To facilitate such engagement, the trailer platform 17 is provided with arcuately shaped supporting areas 18a, which may be termed low friction surface areas by reason of the same being surfaced as by plating or polishing to provide a low co-efficient of friction. A silicon lubricant in the areas 18a may also be utilized. Accordingly, any necessary lateral movement during coupling of the truck with the dolly is provided for. During travel of the surfaces 18a also serve to prevent "scrubbing" of the truck tires across the platform during turning of the dolly and truck.

With reference to the harness plate 33, the same carries locking means comprising a bolt 35 carried within a bore 36 with a cable control 37 operable to retract said bolt to an open, unlatched position. Cable 37 is routed to the truck cab through rotatable guides as at 38 as seen in FIG. 1 with the rearmost guide being supported upon a stationary component of a truck rear wheel assembly.

Figure 6:
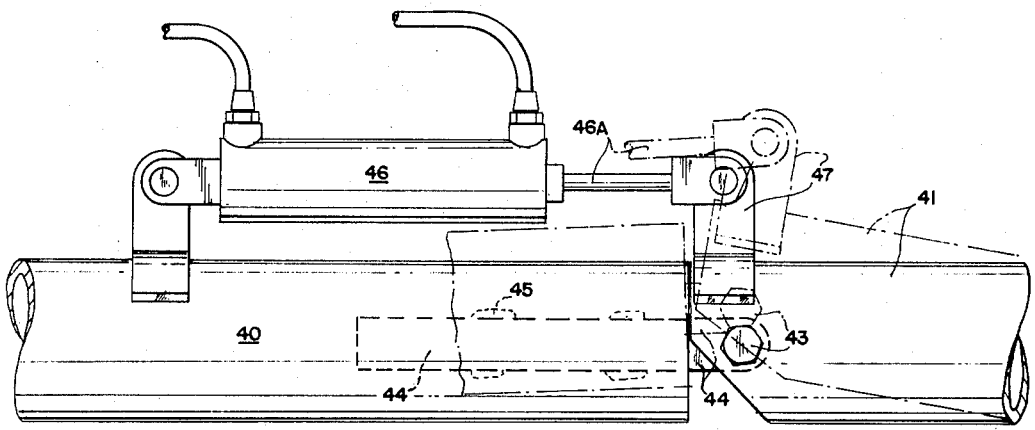
FIG. 6 is a fragmentary, side elevational view of the tongue structure of the dolly parts in broken lines showing their position during truck off loading.

A tongue structure 40 for the dolly includes a secondary tongue 41 secured in braced manner to platform 17 of the dolly. As best viewed in FIG. 6, the two segments of the tongue structure are pivotally joined by a bolt member 43 passing through the secondary tongue 41 and through end portion of end plates 44, which plates are welded as at 45 to the interior of the main tongue 40. Accordingly, the components of the dolly tongue are joined to permit tilting movement of platform 17, and its associated tongue 41 relative to tongue 40 during on and off loading of a truck. Powered means are provided in the form of a double acting hydraulic cylinder 46 having a piston rod 46a terminating in rod and attachment with an upright bracket 47, the latter secured to tongue 41. Retraction of piston rod 46a under the influence of fluid pressure from a source, as for example as a hydraulic pump on the towing vehicle, causes the tongues 40 and 41 to be retained in their solid line positions in axial alignment. Tilting of the trailer platform is achieved by applying fluid pressure to the back end of the cylinder via a three-way valve not shown to extend the piston rod causing the dolly components to move to the broken line position.

As shown in FIGS. 1 and 2, the trailing end of the dolly is provided with ramp means comprising a pair of ramp assemblies at 50. Each assembly includes plural inverted channel sections 51 interconnected cross members 52 over which is secured in place grating 53, the latter serving as a traction surface for the truck wheels. Each ramp assembly is swingably mounted to the dolly frame 17 by means of a rod 54 extending through the inverted channels 53 and mounting blocks 55 interposed therebetween. From this it will be seen that the ramp assemblies may be displaced upwardly relative to frame 17 as the latter tilted into ground contact as illustrated in full and broken lines in FIG. 1. Associated with each ramp assembly 50 is a stationary ramp section 56 secured in place to dolly platform 18 and an upper segment of its frame 17.

The dolly platform is inclined to the broken line position of FIG. 1 to initiate dolly operation to permit backing of the truck over the ramps above-described so as to locate the truck's rear wheels slightly ahead of the platforms transverse center line. Preparatory to backing of the truck, the bolt 35 of the truck harness is retracted to permit reception of pivot pin 24 within opening 34 in plate 33. The truck operator accomplishes this by means of control cable 37 and a foot actuated lever located in the truck cab. Seating of the pin 24 with subsequent release of tension on cable 37 permits compression spring 39, acting on flange 35a of the bolt, to bias the bolt to a closed position. Subsequently cylinder 36 is pressurized to retract its piston rod moving platform 17 to the horizontal position. The platform is now in an operable configuration to permit rear towing of the truck through a field with the truck driver working on the truck bed to load the hay bales delivered to the truck bed.

Unloading of the dolly is accomplished by tensioning of cable 37 against the action of spring 39 whereupon bolt 35 is retracted. Subsequently extension of piston rod 46a moves the dolly platform to include position whereupon the truck may be driven off the dolly.

In FIGS. 7 through 9 an identical dolly is indicated generally at 10' including all of the above-described dolly components which are indicated by prime reference numerals. The operation of the dolly as above described is equally applicable to dolly 10'.

ELEVATOR EQUIPPED DOLLY

The addition of an elevator apparatus indicated generally at 60 in place on the dolly tongue 40' adapts the dolly for use with a flatbed truck 61 of the type having a dump bed with stakes 61a in place on the bed. The use of a dump bed truck is highly advantageous in that the truck may be unloaded and the bales stacked all in a single dumping operation to avoid manual stacking effort. To enable use of such a truck, the elevator structure 60 is added to the dolly for discharge of the bales over the bed stakes.

A baler is indicated at 62 which again may be of the conventional type modified with a dolly hitch framework 63. Bales are discharged in a consecutive manner from the baler for deposit upon the following described elevator apparatus.

An elevator apparatus at 60 comprises a pair of inclined, elongate frame members 64 of an elevator framework, said members supported at their spaced, lower ends by brackets 65 in bolted engagement at 66 to a tongue mounted support 67. Additionally supporting the frame members 64 are a pair of struts 68 which in turn are supported at their lower ends by a second tongue mounted support 69 shown as a cross-wise I-beam segment. In similarity to conventional bale elevators, an engine 71 provides a source of power for a continuous conveyor chain 72 carried by end located sprockets 73 and 74 which chain propels the bales upward along frame components. As the further details of such bale conveyors are well known to those knowledgeable in the art, a further detailed description of the conventional elevator components is believed unnecessary.

For reception of the bales from baler 62, I provide a novel bale tray 75 in bolted attachment as at 76 (FIG. 9) to the conveyor frames 64. Additionally supporting tray 75 are a pair of cables 77 terminating in upward attachment with components of conveyor frame members 64. The tray is of sector shape as viewed in FIG. 8 to receive the bales regardless of the tongue 40' and the baler hitch structure 63 being momentarily misaligned during turns. For purposes of bale positioning, a pair of counter rotating star wheels 80 are provided adjacent the lateral extremities of tray 75. Accordingly, when bales are deposited upon said extremities, the rotating star wheels 80 act to displace the bale towards the tray centerline to align the bale for engagement with the conveyor chain 72. Provided on tray 75, for bale aligning purposes, are a pair of ridges 81. The consecutively discharged bales are deposited on tray 75 with each bale being urged into engagement with conveyor chain 72 by the following bale being discharged by conventional conveyor means of baler 62. Barriers 75a on the tray aid in directing the leading edge of the bale into conveyor chain engagement.

The engine 71 in addition to powering conveyor chain 72 drives the star wheels 80 via a pully 83 entrained about a driven pully 84 carried by a shaft 85 (FIG. 9) journaled at 86 within a sleeve bearing mounted upon one conveyor frame 64. With continuing attention to FIG. 9, it will be seen that a driven sprocket 87 imparts a driving force to an entrained roller chain 88. For purposes of powering elevator conveyor chain 72, a sprocket at 90 is keyed to a shaft 92 to which is also keyed the conveyor chain sprocket 74. Roller chain 88 thence passes upwardly about a sprocket carried by a shaft 93 journaled within bearings 94 mounted on the underside of tray 75. In driving connection with shaft 93 of universally coupled shafts 93a and 93b with the ends of the latter shafts carrying the star wheels 80. Additionally bearings at 94 on the tray underside journal the universally coupled shafts 93a and 93b. Accordingly, the star wheels 80 run in opposite direction whereby arcuate portions of the wheels pass above the upper tray surface for engagement with the hay bale.

The operation of the elevator is believed obvious from the foregoing description. The bales are automatically, upon discharge from the baler, directed into engagement with conveyor chain 72 which ultimately discharges the bales over the truck bed stakes 61a. The truck is loaded by the driver working on the truck bed and when loaded is driven to the unloading site where the dump bed mechanism is actuated resulting in the bales being unloaded in stacked configuration within but a few minutes. While the dump bed mechanism constitutes no part of the present invention, such a truck bed contributes significantly to the efficiency of a haying operation using the dolly of the present invention.

While I have shown but a few embodiments of the invention, it will be apparent to those skilled in the art that the invention may be embodied still otherwise without departing from the spirit and scope of the invention.

Having thus described the invention what is desired to be secured under a Letters Patent is:

1. A dolly for the rear wheels of a truck permitting rearward towing of the truck during a truck loading operation, said dolly comprising,
    a wheel supported dolly platform and frame,
    a tongue structure extending forwardly from the platform, said tongue structure including hinge means about which said platform may tilt into ground contact for on and off loading of the truck,
    powered means associated with said tongue structure adjacent said hinge means for controlling tilting movement of the platform about said hinge means, said powered means being remotely operable by the operator of a dolly towing vehicle,
    a harness mounted on the truck undercarriage and including a recessed plate member, locking means carried by said plate member and remotely operable by the truck driver to permit remote coupling and uncoupling of the truck and dolly, and
    truck mounting means disposed on the dolly platform and adapted for locked engagement with said harness when the rear wheels of the truck are on said platform, said mounting means cooperating with the harness to prevent fore and aft movement of the truck when in place on the dolly while permitting articulated movement between truck and dolly during towing of the truck during which time the truck driver may be stationed on the truck bed to assist in the loading operation.

2. The dolly claimed in claim 1 additionally including ramp means normally projecting rearwardly and downwardly from the dolly frame, said ramp means comprising swingably mounted ramp assemblies upwardly positionable relative to the frame from their normal position of rest upon tilting of the dolly into ground contact.

3. The dolly claimed in claim 1 wherein said truck mounting means additionally includes an elongate support structure in place on the dolly platform, upright pivot means engageable with said recessed plate member of said harness, means adjustably mounting said upright pivot means on said elongate support structure permitting adjustable movement fore and aft of the pivot means to permit varying the initial placement of the truck rear wheels on the platform.

4. The dolly claimed in claim 3 wherein said adjustable means comprises a box-like structure slidably engaged with said elongate support structure, said support structure defining a series of openings therein, insertable means engageable with said elongate support structure within the openings therein to confine said box-like structure against movement along said support structure.

5. The dolly claimed in claim 2 wherein said frame extends about the platform perimeter, said frame comprising straight and curved pipe segments.

6. The dolly as claimed in claim 1 additionally including an elevator apparatus supported by the dolly tongue structure for elevating bales received from a dolly towing baling machine enabling bale transfer to a stake equipped truck bed of the dump bed type, said elevator apparatus including,
an inclined framework carried by the tongue structure and having continuous bale engaging means traveling therealong for moving the bales upwardly along said framework,
a tray receiving the bales discharged from the baling machine and terminating adjacent the lower end of the continuous bale engaging means, said tray having laterally projecting areas for the reception of bales when the baling machine and dolly are not in alignment, and
rotary means associated with the tray and engageable with the bales to assist in centering same on the tray to facilitate their engagement with the continuous bale engaging means whereby bales discharged during temporary misalignment of the baling machine and elevator during turning maneuvers will be received on the tray and centered for ultimate transfer along the elevator for discharge onto the truck bed.

7. The dolly as claimed in claim 6 wherein said tray is of sector-like configuration, said rotary means comprises a pair of powered bale engaging wheels having an arcuate segment passing above the bale supporting surface of the tray.

8. In combination,
a dolly for the rear wheels of a truck permitting rearward towing of the truck during a truck loading operation, said dolly comprising,
a wheel supported dolly platform and frame, a tongue structure extending forwardly from the platform, said tongue structure including hinge means about which said platform may tilt into ground contact for on and off loading of the truck,
powered means associated with said tongue structure adjacent said hinge means for controlling tilting movement of the platform about said hinge means, said powered means being remotely operable by the operator of a dolly towing vehicle, and truck mounting means disposed on the dolly platform and adapted for locked engagement with a harness permanently mounted on the truck undercarriage when the rear wheels of the truck are on said platform, said mounting means cooperating with the harness to prevent fore and aft movement of the truck when in place on the dolly while permitting articulated movement between truck and dolly during towing of the truck during which time the truck driver may be stationed on the truck bed to assist in the loading operation,
a harness permanently mounted on the truck undercarriage, said harness including,
a plate member recessed to receive said truck mounting means,
locking means carried by said plate and remotely operable by the truck driver permitting remote coupling and uncoupling of the truck to the dolly.

9. The dolly claimed in claim 8 wherein said truck mounting means additionally includes an elongate support structure in place on the dolly platform, pivot means engageable with said harness, means adjustably mounting said pivot means on said elongate support structure permitting adjustable movement fore and aft of the pivot means to permit varying the initial placement of the truck rear wheels on the platform.

10. The dolly claimed in claim 9 wherein said adjustable means comprises a box-like structure slidably engaged with said elongate support structure, said support structure defining a series of openings therein, insertable means engageable with said elongate support structure within the openings therein to confine said box-like structure against movement along said support structure.

11. The dolly claimed in claim 10 wherein said pivot means comprises an upright pin carried by said box-like structure, said pin adapted for locked engagement within an opening defined by the harness structure.

* * * * *